United States Patent
Kumar et al.

(10) Patent No.: US 7,477,638 B1
(45) Date of Patent: Jan. 13, 2009

(54) INTERWORKING OF IP VOICE WITH ATM VOICE USING SERVER-BASED CONTROL

(75) Inventors: Rajesh Kumar, Fremont, CA (US); Mohamed Saad-Eldin Mostafa, Emerald Hills, CA (US)

(73) Assignee: Cisco Technology, Inc., San Jose, CA (US)

( * ) Notice: Subject to any disclaimer, the term of this patent is extended or adjusted under 35 U.S.C. 154(b) by 998 days.

(21) Appl. No.: 09/899,630

(22) Filed: Jul. 3, 2001

(51) Int. Cl.
*H04L 12/64* (2006.01)

(52) U.S. Cl. .................. 370/356; 370/401; 370/466

(58) Field of Classification Search ........... 370/402, 370/403, 356, 401, 466
See application file for complete search history.

(56) References Cited

U.S. PATENT DOCUMENTS

| | | | |
|---|---|---|---|
| 5,594,732 A | 1/1997 | Bell et al. | |
| 5,659,542 A | 8/1997 | Bell et al. | |
| 5,715,250 A * | 2/1998 | Watanabe | 370/395.53 |
| 6,041,054 A * | 3/2000 | Westberg | 370/389 |
| 6,111,893 A | 8/2000 | Volftsun et al. | |
| 6,385,195 B2 * | 5/2002 | Sicher et al. | 370/356 |
| 6,519,261 B1 * | 2/2003 | Brueckheimer et al. | 370/395.52 |
| 6,563,794 B1 * | 5/2003 | Takashima et al. | 370/236 |
| 6,587,460 B1 | 7/2003 | Bell et al. | |
| 6,603,774 B1 | 8/2003 | Knappe et al. | |
| 6,628,617 B1 | 9/2003 | Karol et al. | |
| 6,728,261 B1 * | 4/2004 | Sasson et al. | 370/466 |
| 6,741,585 B1 | 5/2004 | Munoz et al. | |
| 6,747,986 B1 * | 6/2004 | Charas et al. | 370/465 |
| 6,754,180 B1 * | 6/2004 | Christie | 370/236 |
| 6,775,273 B1 * | 8/2004 | Kung et al. | 370/356 |
| 6,799,210 B1 * | 9/2004 | Gentry et al. | 709/223 |
| 6,801,542 B1 | 10/2004 | Subbiah | |
| 6,819,678 B2 * | 11/2004 | Sylvain | 370/466 |
| 6,937,598 B1 * | 8/2005 | Hagirahim et al. | 370/356 |

(Continued)

OTHER PUBLICATIONS

International Telecommunication Union (ITU). ITU-T, Q.2630.1. Series Q: Switching and Signalling Broadband ISDN - Common Aspects of B-ISDN Application Protocols for Access Signalling and Network Signalling and Internetworking, AAL type 2 signalling protocol - Capability set 1, 91 pages (Dec. 1999).

(Continued)

*Primary Examiner*—Min Jung
(74) *Attorney, Agent, or Firm*—Blakely, Sokoloff, Taylor & Zafman LLP

(57) ABSTRACT

A method for converting packet-based voice data of a first format directly to packet-based voice data of a second format, and vice versa. Data from networks using non-compatible packet-based voice technologies, for example, VoATM and VoIP, are interworked for direct conversion. Connection is set between an edge gateway of a first voice packet network, having data in a first format, and an interworking unit (IWU). Another connection is set between this IWU and an edge gateway of a second voice packet network, having data in the second format. The IWU is controlled by a single call agent that co-ordinates the conversion, at the IWU, between the two packet formats. Because it has this capability, this call agent is also called the "conversion server". This call agent may be identical to the call agent used to control one or both edge gateways that use different packet based technologies.

36 Claims, 4 Drawing Sheets

U.S. PATENT DOCUMENTS

| | | |
|---|---|---|
| 6,963,569 B1 | 11/2005 | Briddell et al. |
| 7,065,093 B1 | 6/2006 | Kumar et al. |
| 7,283,533 B1 * | 10/2007 | Kumar et al. .......... 370/395.52 |
| 7,302,054 B1 * | 11/2007 | McNiff et al. ................ 379/268 |
| 2002/0054586 A1 * | 5/2002 | Hoffmann ................... 370/352 |
| 2002/0176403 A1 * | 11/2002 | Radian ....................... 370/352 |

OTHER PUBLICATIONS

International Telecommunication Union (ITU). ITU-T, Q.2630.1. Series Q: Switching and Signalling, Broadband ISDN - Common Aspects of B-ISDN Application Protocols for Access Signalling and Network Signalling and Internetworking, AAL type 2 signalling protocol - Capability set 1, Annex B: SDL definition of the AAL type 2 signalling protocol CS-1, 70 pages (Mar. 2001)

International Telecommunication Union (ITU). ITU-T, I366.1. Series I: Integrated Services Digital Network - Overall Network Aspects and Functions - Protocol Layer Requirements, Segmentation and Reassembly Service Specific Convergence Sublayer for the AAL type 2, 37 pages (Jun. 1998).

International Telecommunication Union (ITU). ITU-T, I366.2, Series I: Integrated Services Digital Network - Overall Network Aspects and Functions - Protocol Layer Requirements, AAL type 2 Service Specific Convergence Sublayer for Trunking, 86 pages (Feb. 1999).

The ATM Forum Technical Committee: Circuit Emulation Services Interoperability Specification Version 2.0, af-vtoa-0078.000, 101 pages (Jan. 1997).

* cited by examiner

US 7,477,638 B1

INTERWORKING OF IP VOICE WITH ATM VOICE USING SERVER-BASED CONTROL

FIELD OF THE INVENTION

The present invention relates generally to packet-based telephony, and in particular to apparatuses and methods for the interworking of two or more non-compatible packet-based voice technologies.

BACKGROUND OF THE INVENTION

Telephone carriers are deploying various packet-based voice technologies such as Real-time Transport Protocol/Internet Protocol (RTP/IP) and Asynchronous Transfer Mode Adaptation Layer 2 (ATM/AAL2). These technologies do not interwork seamlessly. Currently deployed call agents, software systems that establish the connections across packet-based voice network, do not have the capability to co-ordinate the conversion of different types of packet-based data. Two different types of packet-based voice technologies, for example VoIP and VoATM can be made to interwork with each other with a public switched telephone network (PSTN) between them. However, the PSTN middleman necessitates costly and inefficient conversion into outdated time division multiplexing (TDM) format and thence to another packet-based format. This lack of interworking is at the bearer and control levels. As a result, there are various, pioneering packet "islands" that use the outdated, PSTN as the glue, thereby annulling the advantages of packet-based voice technology over large geographical areas. Using the PSTN also incurs signal degradation because the PSTN uses only non-compressed voice signals. Packet networks may use compressed signals that need to be converted into non-compressed format and then converted back into compressed format.

FIG. 1 is a block diagram depicting a typical conversion from an IP network to an ATM network. In the telecommunications network 100 shown in FIG. 1, telephonic data is received at voice over IP (VoIP) edge gateway 102. This data may be received from individual telephones, a private telephone network such as a private branch exchange (PBX), a data modem, or a fax machine, among others. Edge gateway 102 is a combination of software and hardware that bridges the gap between the telephone network and the IP network. Edge gateway 102 may be integrated into the telephone or PBX. The telephonic data is then routed over IP network 104 to trunk gateway 106. Establishment of the connection between the VoIP edge gateway 102 and trunk gateway 106 is controlled by one, or more, call agents 108. The call agent 108 establishes the IP session between the VoIP edge gateway 102 and the trunk gateway 106, and coordinates the conversion of data from IP format to TDM format. The data is transmitted over TDM trunk lines 109 to a network of PSTN switches 110. The TDM trunk lines may be, for example, T1 lines. The data is now transmitted over TDM trunk lines 111 to trunk gateway 112. The connection between the trunk gateway 112 and the voice over ATM (VoATM) edge gateway 116 is controlled by one, or more, call agents 118. Further, call agents 108 and 118 can communicate with each other and with the PSTN switches through a Signaling System 7 (SS7) control network. The call agent 118 initiates the establishment of an ATM connection, and coordinates the conversion of data from TDM format to ATM format. The data is routed through ATM network 114 to VoATM edge gateway 116. From VoATM gateway 116 the telephonic data is transmitted to its destination telephone or PBX, for example.

The routing of packet-based voice data through a PSTN defeats one of the advantages of packet-based voice transmission, which is that the voice data can be compressed, thereby reducing bandwidth and cost. No such voice compression is possible in a PSTN; the telephonic data must be decompressed upon entering the PSTN and, recompressed upon exiting the PSTN. By routing VoIP data through a PSTN to an ATM network, this major advantage of packet-based voice technology is negated.

SUMMARY OF THE INVENTION

A method and apparatus is described for converting packet-based voice data of a first format directly to packet-based voice data of a second format. Data from two networks using non-compatible packet-based voice technologies, for example, VoATM and VoIP, is interworked for direct conversion. A connection is set between an edge gateway of a first voice packet network, having data in a first format, and an interworking unit (IWU). Another connection is set up between this IWU and an edge gateway of a second voice packet network, having data in the second format. The IWU is controlled by a single call agent that is able to co-ordinate the conversion, at the IWU, between the two packet formats. Because it has this capability, this call agent is also called the "conversion server". This call agent may be identical to the call agent used to control one or both edge gateways that use different packet based technologies.

Other features and advantages of the present invention will be apparent from the accompanying drawings, and from the detailed description, which follows below.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

An embodiment of the present invention will provide a simple method of interworking the call control and voice information of different voice packet networks (e.g., VoIP data with VoATM data). This is accomplished by taking advantage of the call-agent based complex call handling software to interwork the control information native to each of the packet networks. This software, called the "conversion server" software herein, provides a conversion between ATM parameters and IP parameters (e.g., AAL-2 profiles versus RTP/AVP payload types). The "conversion server" software also controls the IP-ATM conversion function that is modeled in terms of packet-to-packet endpoints within the Interworking Unit (IWU). If necessary, the interworking unit (IWU) accepts ATM switched virtual circuit signaling or AAL International Telecommunications Union Telecommunications (ITU) standard Q.2630.1 signaling to establish a bearer path in the ATM network and to bind into an RTP port on the other side of the Interworking Unit (IWU).

In one embodiment the ATM data is ATM Adaptation Layer Type 2 (AAL-2) data. In one embodiment the call agent that manages the VoATM network has the "conversion server" software and is used to interwork the VoATM and VoIP control information. This call agent, that has conversion capability, may be selected by the originating call agent based on destination number. In an alternative embodiment, the call agent that manages the VoIP network has the "conversion server" software and is used to interwork the VoATM and VoIP control information.

An intended advantage of one embodiment of the present invention is to provide user-transparent end-to-end code/profile negotiation that spans the IP and ATM networks. Another intended advantage is to provide the ability to access an adjacent packet network that uses a different technology (e.g., IP, ATM/PNNI, ATM/AAL2) with a minimal number of endpoints and links. Another intended advantage of one embodiment of the present invention is to provide the ability to interwork various packet-based voice technologies without recourse to legacy communication networks (e.g., PSTN).

Figure 1:
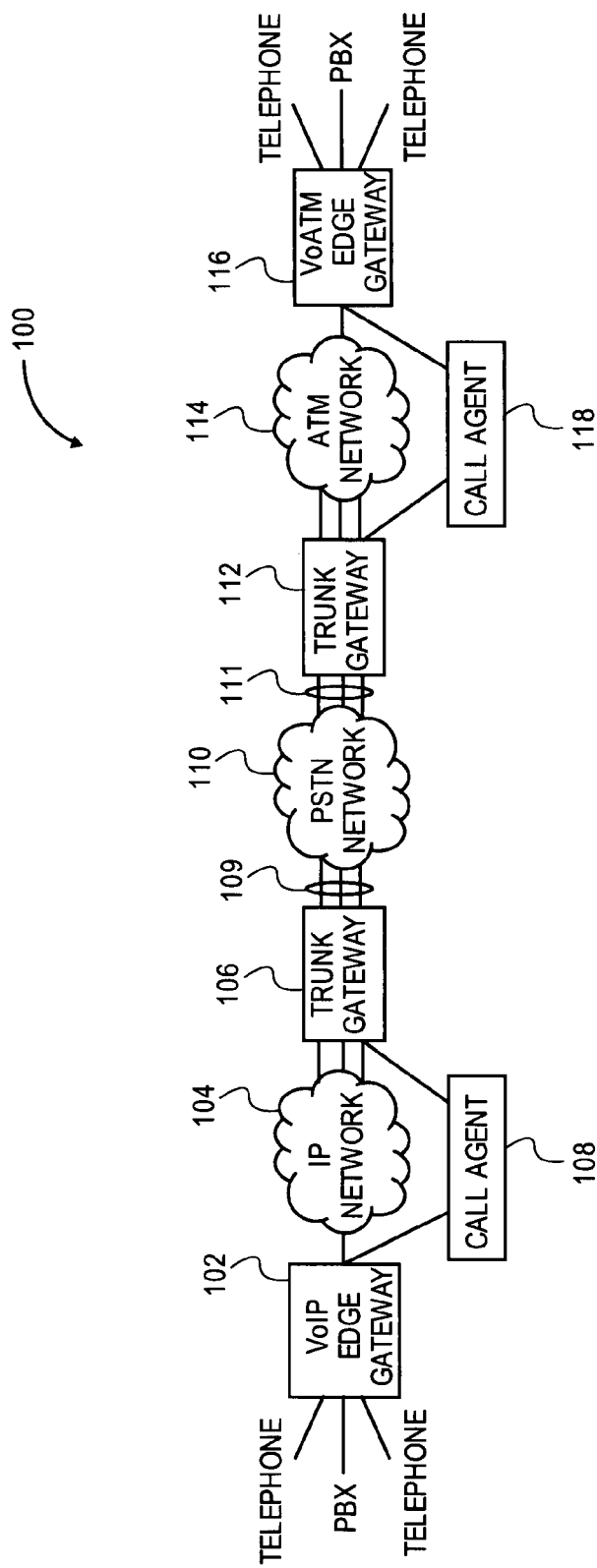
FIG. 1 is a block diagram depicting a typical conversion from an IP network to an ATM network in accordance with the prior art.
Figure 2:
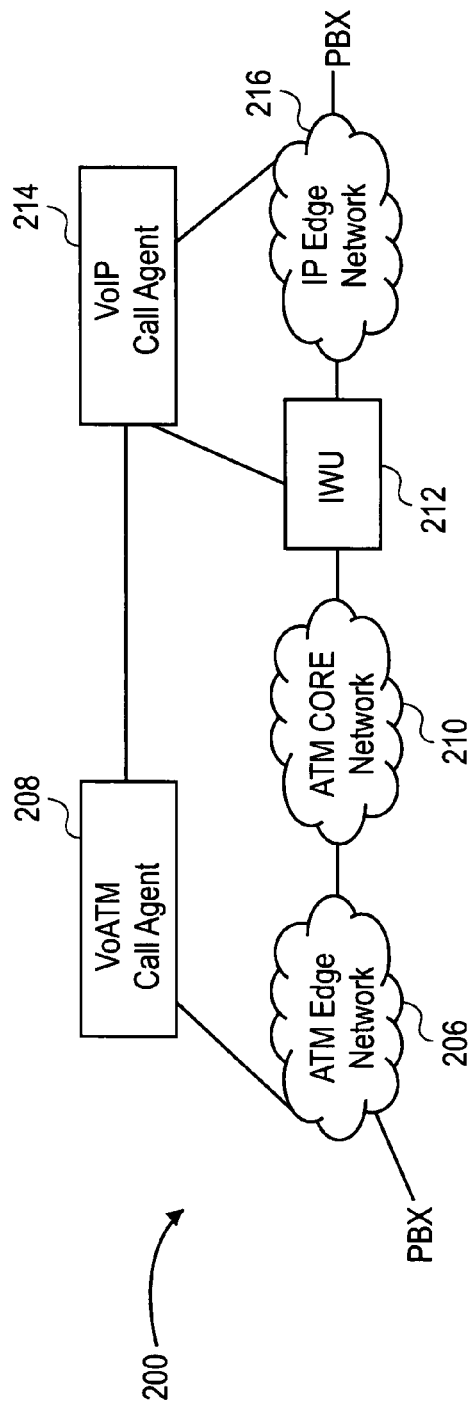
FIGS. 2 and 3 are block diagrams depicting the conversion of IP data to ATM data in accordance with the present invention.
Figure 3:
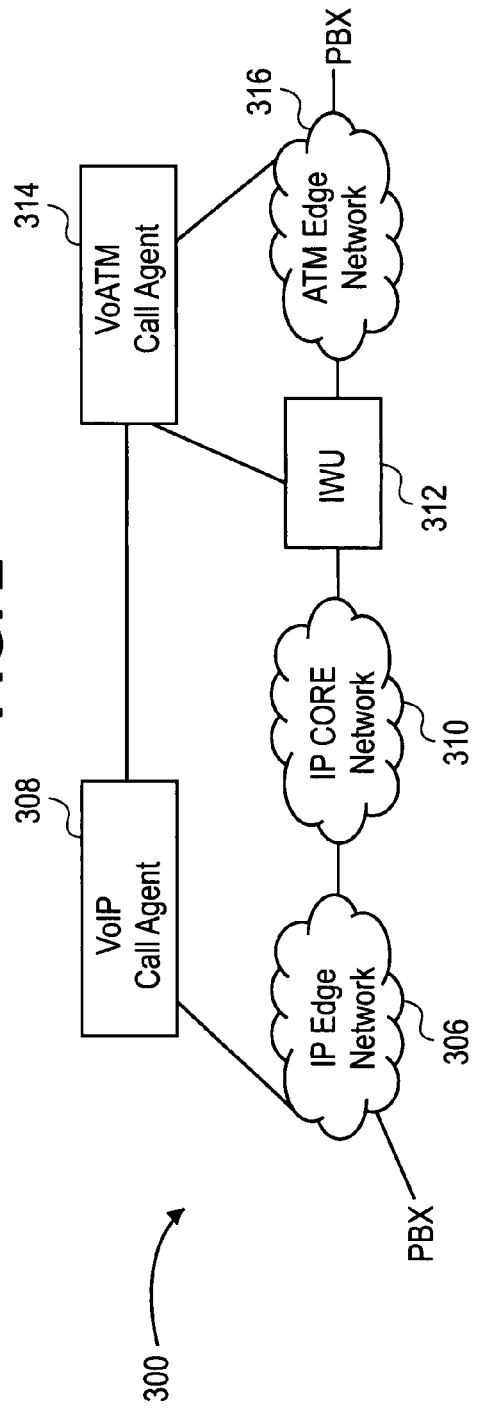

FIGS. 2 and 3 are block diagrams depicting the conversion of voice packet data from one voice packet data format to another in accordance with the present invention. Both figures depict the conversion of telephonic data between VoIP and VoATM and vice versa. In FIG. 2, the packet conversion function in the IWU is controlled by the VoIP call agent. In FIG. 3, the packet conversion function in the IWU is controlled by the VoATM call agent. The following process describes conversion between VoATM and VoIP as implemented by the system illustrated in FIG. 2. The conversion process implemented by the system of FIG. 3 is analogous.

The telecommunications system 200 shown in FIG. 2 includes a VoATM edge network 206. Telephonic data from, for example, a PBX, is received at a VoATM edge device of VoATM edge network 206, i.e., the VoATM edge device receives a set-up message. The VoATM edge network is coupled to a VoATM call agent 208 that sends signals to the VoATM edge device in order to create a connection. In response, the VoATM edge gateway device sends the VoATM call agent 208 a session descriptor that includes such information as ATM address and profile information. The VoATM call agent 208 is linked to a VoIP call agent 214 that interfaces an interworking unit (IWU) 212. The IWU 212 is coupled to the ATM network 210 and to the IP edge network 216. The IWU 212 is described in greater detail below. The VoIP call agent 214 receives the session descriptor from the VoATM call agent 208. The "conversion server" function in the VoIP call agent 214 converts VoATM-specific parameters (such as AAL2 profiles) in this session descriptor into VoIP-specific parameters (such as codecs). It selects a packet-to-packet endpoint in the IWU 212 as the resource responsible for converting voice traffic between the VoATM and VoIP formats. It passes these derived (converted) VoIP-specific parameters, along with the original session descriptor, to an interworking unit (IWU) 212. The IWU 212 responds to the VoIP call agent 214 with its own session descriptor including its own IP address and preferred encoding schemes. Simultaneously, the IWU 212 uses the ATM address information forwarded by the VoIP call agent 214 to set-up an ATM path [such as a Switched Virtual Circuit (SVC) or an AAL2 channel] to the VoATM edge device of VoATM edge network 206. The VoIP call agent 214 then establishes a connection between the IWU and a VoIP edge gateway device of VoIP edge network 216. The VoIP edge gateway device sends its session descriptor to the VoIP call agent 214. The "conversion server" function in the VoIP call agent 214 converts VoIP-specific parameters (such as the encoding scheme selected for the connection) in this session descriptor into VoATM-specific parameters (such as profile). It passes the derived (converted) VoATM-specific parameters, along with the original session descriptor from the VoIP edge network 216, to IWU 212. As an acknowledgement, IWU indicates its acceptance of the selected AAL2 profile and the selected, inter-working RTP codec/payload type. The conversion server function creates an ATM-specific SDP descriptor from the information provided by the IP edge network 216 and the IWU 212, and forwards it to the VoATM call agent 208 that forwards it to the ATM edge gateway device. At this point a fully characterized end-to-end connection has been established between an ATM segment and an IP segment.

Figure 4:
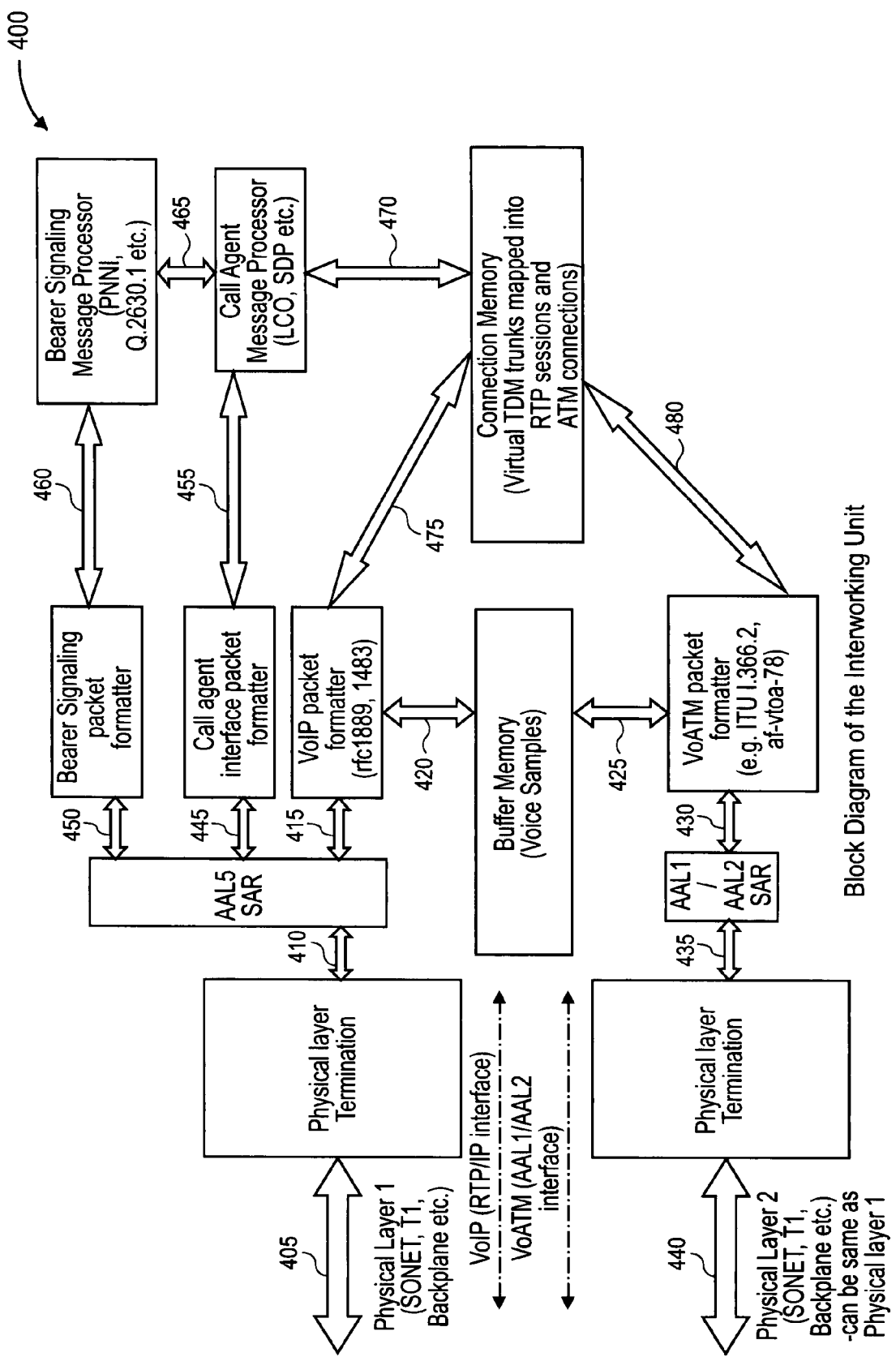
FIG. 4 is a block diagram of an IWU in accordance with the present invention.

FIG. 4 illustrates the functionality of an IWU 400 in accordance with one embodiment. The conversion of VoIP to VoATM begins at operation 405 in which voice data is received as VoIP at the physical layer. The physical layer may be, for example, synchronous optical network data (SONET). The AAL-5 data is extracted from the physical layer at operation 410. From this data, the bearer signaling information is extracted at operation 450, the call agent information is extracted at operation 445, and the VoRTP information is extracted at operation 415. At operation 420, the voice samples are extracted from the VoRTP information and stored to buffer memory. At operation 425 the voice samples are formatted as AAL-1 or AAL-2 protocol data units (PDUs). The formatting may be accomplished in accordance with ATM Forum—Voice and Telephony over ATM specification 78 for AAL-1 data, and International Telecommunications Union specification 1.366.2 for AAL-2 data. At operation 430 the data is reformatted as ATM cells. At operation 435 the ATM cells are used to create a VoATM data stream, and at operation 440 the VoATM data is output to the appropriate physical layer (e.g., SONET).

The call agent information that contains the media gateway control protocol (MGCP) and session description protocol (SDP) is forwarded to the call agent message processor at operation 455. The call agent message processor interfaces to the VoIP call agent. In an alternative embodiment the call agent message processor interfaces to the VoATM call agent. The choice of the call agent is based on whether the "conversion server" software is located in the VoIP or VoATM call agents. As shown in FIGS. 2 and 3, the IWU has an interface with the VoIP call agent (FIG. 2), or with the VoATM call agent (FIG. 3). The Interworking Unit interfaces to a call agent that has the conversion server software built into it.

The call agent message processor interprets the SDP. The "conversion server" function in the call agent is responsible for deriving IP parameters from an ATM SDP, and the ATM parameters from an IP SDP. The "conversion server" function in the call agent is also responsible for identifying the packet relay endpoint to be used. The RTP port information in the SDP, the packet relay endpoint identifier and the virtual circuit identifier (VCI) or AAL2 channel identifier (CID) that it is mapped into is stored in the form of packet relay endpoint associations at operation 470. This information controls how the RTP streams flow into the VoATM streams and vice versa.

At operation 460, the bearer signaling information, extracted from the AAL-5 data at operation 450, is forwarded to the bearer signaling message processor. Based on the MGCP and the SDP messages, a bearer path, for example, a switched virtual circuit (SVC), or an AAL-2 path, is established. When the path is established a status indication is sent. The bearer signaling is described in more detail, below, in reference to FIG. 5.

There is no separate conversion of VoATM to VoIP. The path established through the Interworking Unit (IWU) is a bi-directional path. Whenever there is VoATM to VoIP conversion, there is VoIP to VoATM conversion, and vice versa.

Figure 5:
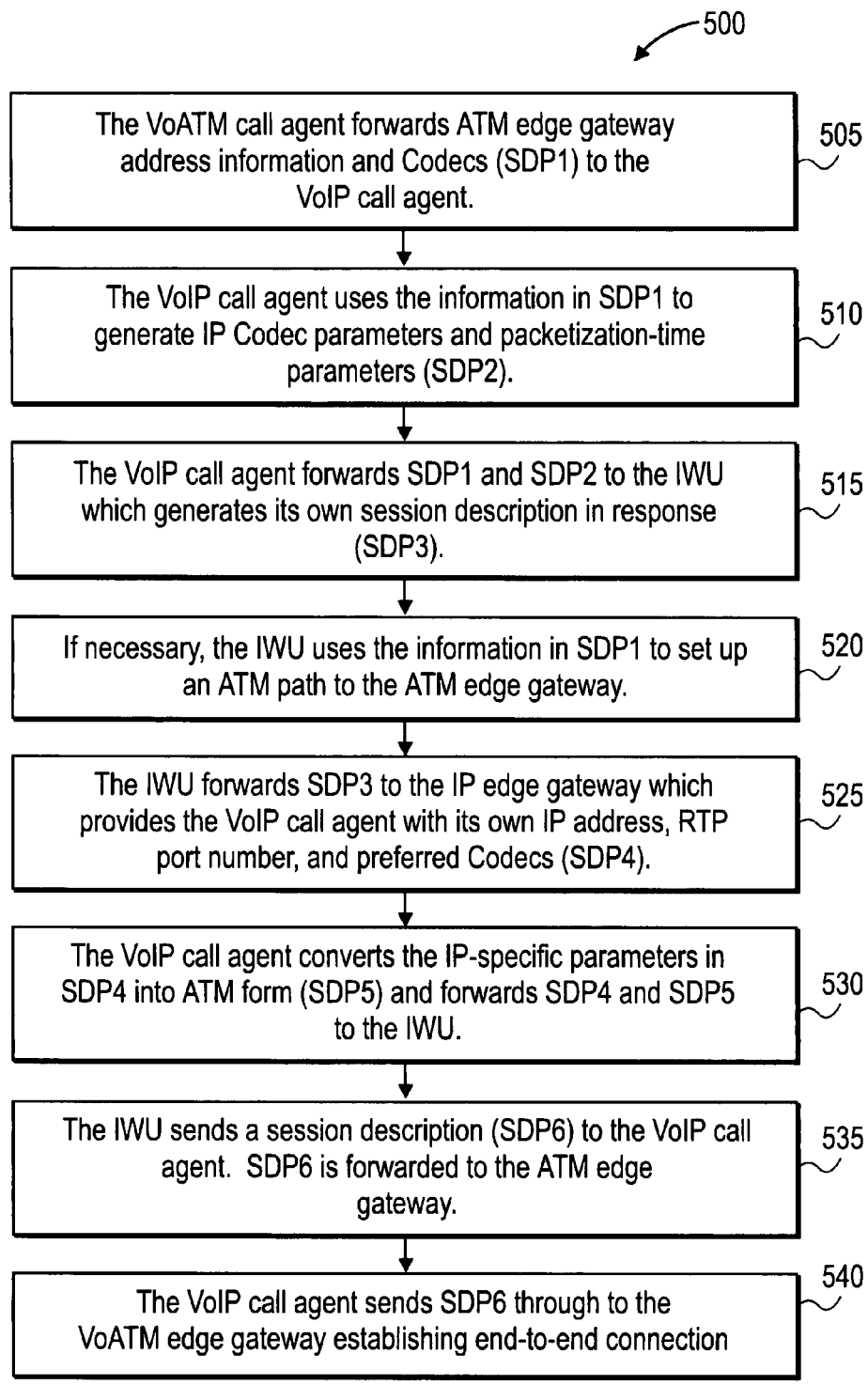
FIG. 5 is a process flow diagram according to one embodiment of the present invention.

The following describes a VoATM-VoIP call set-up using an ATM core network as shown in FIG. 2. Depending on the signaling format used by the PBX, the ATM edge gateway forwards a set-up message from the PBX to the VoATM call agent, or sends event notifications indicating off-hook status and the dialed number. On the basis of the dialed number, the VoATM call agent determines that it is necessary to use the VoIP call agent in routing the call. The VoATM call agent sends a connection establishment command to the VoATM edge gateway. The connection establishment command contains a list of coder-decoders (codecs) encapsulated in local connection options (LCOs). The list of codecs represents available encoding schemes that may involve compression/decompression. The ATM edge gateway chooses one or more of the alternatives, provided in the LCO, and encapsulates that information in a SDP descriptor (SDP1). Within SDP1, the ATM edge gateway also includes its identification information including its own ATM address information. The address information may typically include an nsap address, a vcci, and a cid. SDP1 may also include a four octet identifier known as the Backbone Network Connection Identifier (BNC-ID) which is used to identify which ATM path is associated with which voice call. SDP1 also includes ATM specific profile information that describes which codecs are to be used. The process is described from this point forward by FIG. 5. FIG. 5 is a process flow diagram according to one embodiment of the present invention. Process 500, shown in FIG. 5, begins at operation 505 in which the information in SDP1 is sent to the VoATM call agent that forwards the information to the VoIP call agent. At operation 510 the VoIP call agent uses the information in SDP1 to generate IP codec parameters and packetization-time parameters. The VoIP call agent encapsulates this information as SDP2. SDP2 is SDP1 as translated by the VoIP call agent. The VoIP call agent forwards SDP1 and SDP2 to the IWU that generates its own SDP (SDP3) in response, operation 515. SDP 3 includes the IWU's own IP address and IWU preferences for RTP port number, codecs, and packetization period. If necessary, the IWU uses the information in SDP1 (such as the NSAP address and the BNC-ID) to set up an ATM path such as a Switched Virtual Circuit (SVC) or an AAL2 channel to the ATM edge gateway, operation 520. This uses SVC signaling (such as Private Network-Node Interface signaling defined by the ATM forum) or the Q.2630.1 signaling defined by the International Telecommunications Union (ITU). At the same time, SDP3 is forwarded to the IP edge gateway that provides the VoIP call agent with its own IP address, RTP port number, and chosen codec in operation 525 as SDP4. The VoIP call agent converts the IP-specific parameters in SDP4 into ATM form (e.g. the chosen codec into a chosen profile), packages the converted information into SDP5 and forwards both SDP4 and SDP5 to the IWU in operation 530.

At this point the connection between the IWU and the IP edge gateway has been set, i.e., the IWU and the IP edge gateway know the IP addresses and RTP port numbers of each other.

At operation 535 the IWU sends the VoIP call agent an SDP descriptor, SDP6, which is forwarded to the ATM edge gateway. This includes the selected AAL2 profile for the connection that was derived in operation 520. At operation 540 the VoIP call agent sends SDP6 through to the VoATM edge gateway. This allows the VoATM edge gateway to know which profile to use. The ATM path to be used is conveyed through the BNC-ID in the signaling flows referred to in operation 520. At this point an end-to-end connection via the VoATM and VoIP networks has taken place.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
setting a first connection between an edge gateway of a first voice packet network that receives voice data from a first terminal device in a first format, and an interworking unit;
setting a second connection between an edge gateway of a second voice packet network that transmits voice data to a second terminal device in a second format, and the interworking unit; and
controlling the interworking unit to directly convert the voice data of the first format to voice data of the second format by one of a call agent of the first voice packet network or a call agent of the second voice packet network.

2. The method of claim 1, wherein the interworking unit interfaces with a call agent of a voice packet network.

3. The method of claim 1, wherein the first voice packet network is a voice over asynchronous transfer mode adaptation layer 2 network.

4. The method of claim 3, wherein the voice over asynchronous transfer mode adaptation layer 2 network is selected from the group consisting of a ITU Q.2630.1 controlled network, a PNNI controlled single-channel per Switched Virtual Circuit network, and a permanent virtual circuits network.

5. The method of claim 1, wherein the second voice packet network is an internet protocol (IP) network capable of transporting real time protocol.

6. The method of claim 5, wherein the interworking unit interfaces with a call agent over the internet protocol network.

7. A machine-readable medium that provides executable instructions, which when executed by a processor, cause said processor to perform a method comprising:
setting a first connection between an edge gateway of a first voice packet network, having voice data of a first format, and an interworking unit; and
setting a second connection between an edge gateway of a second voice packet network, having voice data of a second format, and the interworking unit, wherein the interworking unit provides a conversion function to directly convert one of the voice data of the first format to voice data of the second format or the voice data of the second format to voice data of the first format, wherein the conversion function is controlled by one of a call agent of the first voice packet network or a call agent of the second voice packet network.

8. The machine-readable medium of claim 7, wherein the interworking unit interfaces with a call agent of a voice packet network.

9. The machine-readable medium of claim 7, wherein the first voice packet network is a voice over asynchronous transfer mode adaptation layer 2 network.

10. The machine-readable medium of claim 9, wherein the voice over asynchronous transfer mode adaptation layer 2 network is selected from the group consisting of a ITU Q.2630.1 controlled network, a PNNI controlled single-channel per Switched Virtual Circuit network, and a permanent virtual circuits network.

11. The machine-readable medium of claim 7, wherein the second voice packet network is an internet protocol (IP) network capable of transporting real time protocol.

12. The machine-readable medium of claim 11, wherein the interworking unit interfaces with a call agent over the internet protocol network.

13. An apparatus comprising:
a first edge gateway of a first voice packet network that receives voice data from a first terminal device in a first format;
a second edge gateway of a second voice packet network that transmits voice data to a second terminal device in a second format;
an interworking unit that couples the first edge gateway to the second edge gateway;
a first call agent to set a first connection between the first edge gateway and the interworking unit; and
a second call agent to set a second connection between the second edge gateway and the interworking unit;
wherein one of the first call agent or the second call agent controls the interworking unit to directly convert the voice data of the first format to voice data of the second format.

14. The apparatus of claim 13, wherein the interworking unit interfaces with a call agent of a voice packet network.

15. The apparatus of claim 13, wherein the first voice packet network is a voice over asynchronous transfer mode adaptation layer 2 network.

16. The apparatus of claim 15, wherein the voice over asynchronous transfer mode adaptation layer 2 network is selected from the group consisting of a ITU Q.2630.1 controlled network, a PNNI controlled single-channel per Switched Virtual Circuit network, and a permanent virtual circuits network.

17. The apparatus of claim 13, wherein the second voice packet network is an internet protocol (IP) network capable of transporting real time protocol.

18. The apparatus of claim 17, wherein the interworking unit interfaces with a call agent over the internet protocol network.

19. An interworking unit comprising:
a first physical layer termination that receives voice data from a first terminal device in a first voice packet format;
a second physical layer termination that transmits voice data to a second terminal device in a second voice packet format;
a voice packet network conversion module to convert data of the first voice packet format to the second voice packet format; and
a call agent interface to interface to a voice packet network call agent such that the voice packet network call agent coordinates the conversion of data from the first voice packet format directly to the second voice packet format.

20. The interworking unit of claim 19, wherein the first voice packet format is voice over internet protocol and the second voice packet format is voice over asynchronous transfer mode.

21. The interworking unit of claim 20, wherein the voice packet network call agent is a voice over internet protocol call agent.

22. The interworking unit of claim 20, wherein the voice packet network call agent is a voice over asynchronous transfer mode call agent.

23. The interworking unit of claim 19, wherein the first voice packet format is voice over asynchronous transfer mode and the second voice packet format is voice over internet protocol.

24. The interworking unit of claim 23, wherein the voice packet network call agent is a voice over internet protocol call agent.

25. The interworking unit of claim 23, wherein the voice packet network call agent is a voice over asynchronous transfer mode call agent.

26. The interworking unit of claim 19, wherein the voice data is received from a voice over asynchronous transfer mode adaptation layer 2 network selected from the group consisting of a ITU Q.2630.1 controlled network, a PNNI controlled single-channel per Switched Virtual Circuit network, and a permanent virtual circuits network.

27. The interworking unit of claim 19, wherein each terminal device is one of an individual telephone, a private telephone network, a private branch exchange (PBX), a data modem, or a fax machine.

28. An apparatus comprising:
means for setting a first connection between an edge gateway of a first voice packet network that receives voice data from a first terminal device in a first format, and an interworking unit;
means for setting a second connection between an edge gateway of a second voice packet network that transmits voice data to a second terminal device in a second format, and the interworking unit; and
means for controlling the interworking unit to directly convert the voice data of the first format to voice data of the second format by one of a call agent of the first voice packet network or a call agent of the second voice packet network.

29. The apparatus of claim 28, wherein the first voice packet format is voice over internet protocol and the second voice packet format is voice over asynchronous transfer mode.

30. The apparatus of claim 29, wherein the voice packet network call agent is a voice over internet protocol call agent.

31. The apparatus of claim 29, wherein the voice packet network call agent is a voice over asynchronous transfer mode call agent.

32. The apparatus of claim 28, wherein the first voice packet format is voice over asynchronous transfer mode and the second voice packet format is voice over internet protocol.

33. The apparatus of claim 32, wherein the voice packet network call agent is a voice over internet protocol call agent.

34. The apparatus of claim 32, wherein the voice packet network call agent is a voice over asynchronous transfer mode call agent.

35. The apparatus of claim 28, wherein the first voice packet network is a voice over asynchronous transfer mode adaptation layer 2 network selected from the group consisting of a ITU Q.2630.1 controlled network, a PNNI controlled single-channel per Switched Virtual Circuit network, and a permanent virtual circuits network.

36. The apparatus of claim 28, wherein each terminal device is one of an individual telephone, a private telephone network, a private branch exchange (PBX), a data modem, or a fax machine.

* * * * *